US 12,287,885 B1

United States Patent
Matrosov et al.

(10) Patent No.: US 12,287,885 B1
(45) Date of Patent: Apr. 29, 2025

(54) REACHABILITY ANALYSIS FOR BINARY EXECUTABLES

(71) Applicant: Binarly Inc, Santa Monica, CA (US)

(72) Inventors: Alexander Matrosov, Santa Monica, CA (US); Sam Lloyd Thomas, Birmingham (GB); Yegor Vasilenko, Cambridge (GB)

(73) Assignee: Binarly Inc, Santa Monica, CA (US)

(*) Notice: Subject to any disclaimer, the term of this patent is extended or adjusted under 35 U.S.C. 154(b) by 0 days.

(21) Appl. No.: 18/991,051

(22) Filed: Dec. 20, 2024

(51) Int. Cl.
*G06F 8/40* (2018.01)
*G06F 21/57* (2013.01)

(52) U.S. Cl.
CPC ............. *G06F 21/577* (2013.01); *G06F 8/40* (2013.01); *G06F 2221/033* (2013.01)

(58) Field of Classification Search
CPC ..... G06F 8/40; G06F 21/577; G06F 2221/033
USPC ........................................................ 717/129
See application file for complete search history.

(56) References Cited

U.S. PATENT DOCUMENTS

2023/0141948 A1* 5/2023 Menashe ............. G06F 11/3696
717/124
2024/0403425 A1* 12/2024 Shimada ................ G06F 21/577

OTHER PUBLICATIONS

Wenjie Sun et al., Software Supply Chain Analysis Based on Function Similarity, ICEMCE, 2020, retrieved online 2025—Mar. 10, 2025, pp. 1-6. Retrieved from the Internet: <URL https://iopscience.iop.org/article/10.1088/1742-6596/1601/5/052020/pdf:> (Year: 2020).*

* cited by examiner

*Primary Examiner* — Hanh Thi-Minh Bui
(74) *Attorney, Agent, or Firm* — Jones Day

(57) ABSTRACT

In the context of software security, reachability analysis provides a mechanism to assess the ease of exploitability of a particular vulnerability or whether a vulnerability is exploitable at all. The present techniques provide a mechanism to compute reachability for one or more binary executables within the context of an execution environment. These reachability analyses can be used to determine whether the executables or components therein present any potential vulnerabilities which, in turn, can cause a computing system executing such binary executable to exhibit undesired behavior. The analyses include determining reachability metrics for each of a plurality of program locations. These metrics are used to determine an environment-aware reachability metric reflecting the runtime properties of a computing environment specified by artefacts associated with the software. Remediation actions can then be undertaken to address any security issues in the software or take other actions before it is deployed or allowed to execute.

22 Claims, 5 Drawing Sheets

REACHABILITY ANALYSIS FOR BINARY EXECUTABLES

TECHNICAL FIELD

The subject matter described herein relates to binary program analysis techniques for more efficiently analyzing binary executables using reachability analyses in order to determine whether they present any potential vulnerabilities which, in turn, can cause a computing system to exhibit undesired behavior.

BACKGROUND

Analysis of binary executables is critical as the transformation from source code to a binary file representation (sometimes referred to as a "binary" or an "executable") introduces a number of security risks which are often difficult to identify and otherwise assess. Malicious actors, whether through a compiler or otherwise, can covertly insert code within build systems to cause systems to exhibit undesired behavior. The increasing complexity of software packages and their interdependencies, in turn, increases the difficulty of finding vulnerabilities. Further, the process of compilation can result in other risks such as introducing new vulnerabilities or reversing security measures implemented in source code thereby exacerbating the security risks. The analysis of binary files can be computationally expensive and place burdens on overall analysis system performance especially when analyzing numerous software packages.

SUMMARY

In a first aspect, a reachability analysis for software includes receiving an executable or a container comprising a plurality of software components and artefacts. At least a portion of the artefacts configure runtime properties of a computing environment executing the software components. Thereafter, the container is decomposed into the plurality of software components and the artefacts. A reachability metric is determined for each component for each of a plurality of program locations. It is then determined, for each component based on its reachability metrics, an environment-aware reachability metric reflecting the runtime properties of the computing environment specified by the artefacts. Data characterizing the determined environment-aware reachability metrics for the components can be provided to a consuming application or process.

The consuming application or process can identify security vulnerabilities or other issues in the software package which require remediation or other action. Responsive action such as initiating at least one remediation action can be initiated to address the identified security vulnerabilities. The remediation actions can take varying forms including patching or fixing the identified security vulnerabilities, preventing at least a portion of the software components from being executed, quarantining the container, and the like.

The determination of the reachability metrics can include constructing a set of inter-procedural control-flow graphs (ICFGs) for each component. In some variations, the determination of the reachability metrics includes analyzing the ICFGs to identify structural properties indicative of reachability. The structural properties can include unreachable code, dead code, missing edges, and/or missing blocks. The determination of the reachability metrics can include constructing, for each component, a code cross-reference graph based on the ICFGs, the code cross-reference graph having vertices representing basic blocks and edges representing load operations reference program points. The determination of the reachability metrics can include identifying, based on the ICFGs, entry points for each component. The determination of the reachability metrics can include determining, for each component based on the corresponding entry points, the ICFG, and program locations, a set of reachable program locations. The determination of the reachability metrics further can include classifying each reachable program location by a type of entry point used to reach such reachable program location. The determination of the reachability metrics can include merging, for components having program locations that are deemed to be unreachable, the code cross-reference graph and the ICFGs to result in a merged graph, and checking paths in the merged graph to determine whether the program locations that were deemed to be unreachable are reachable. The determination of the reachability metrics can include labeling, based on the checking of paths in the merged graph, any program locations determined to be unreachable.

The reachability metric can characterize one or more of direct reachability, exported reachability, referenced reachability, or undetermined reachability.

In an interrelated aspect, data characterizing a software component and potentially reachable program points within the software component is received. The received data is used to perform each of a control-flow recovery, a data-flow analysis, and a cross-reference recovery so that entry points can be identified. Reachability is computed for the identified entry points. Data characterizing the computed reachability is provided to a consuming application or process.

Reachability can also be computed for indirectly reachable program points

Reachability for the entry points can be classified. Metrics characterized reachability can also be generated. The provided data characterizing computed reachability includes the reachability classifications and the generated metrics.

In a further interrelated aspect, software can be analyzed by receiving data characterizing each of a first software component and a second software component. Reachability is computed in the first software component. In addition, external functional calls are computed in the second software component. A joint reachability computation is computed for the first and software component and the second software component based on the computed reachability and the computed external function calls. Data characterizing the computed joint reachability computation is provided to a consuming application or process.

Classifications can be generated which characterize reachability for entry points in each of the first software component and the second software component. In addition, metrics characterizing reachability can be generated for each of the first software component and the second software component. The provided data characterizing the computed joint reachability can include the reachability classifications and the generated metrics.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides binary program analysis techniques for more precisely and rapidly identifying software supply chain security risks in software packages without having access to source code.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
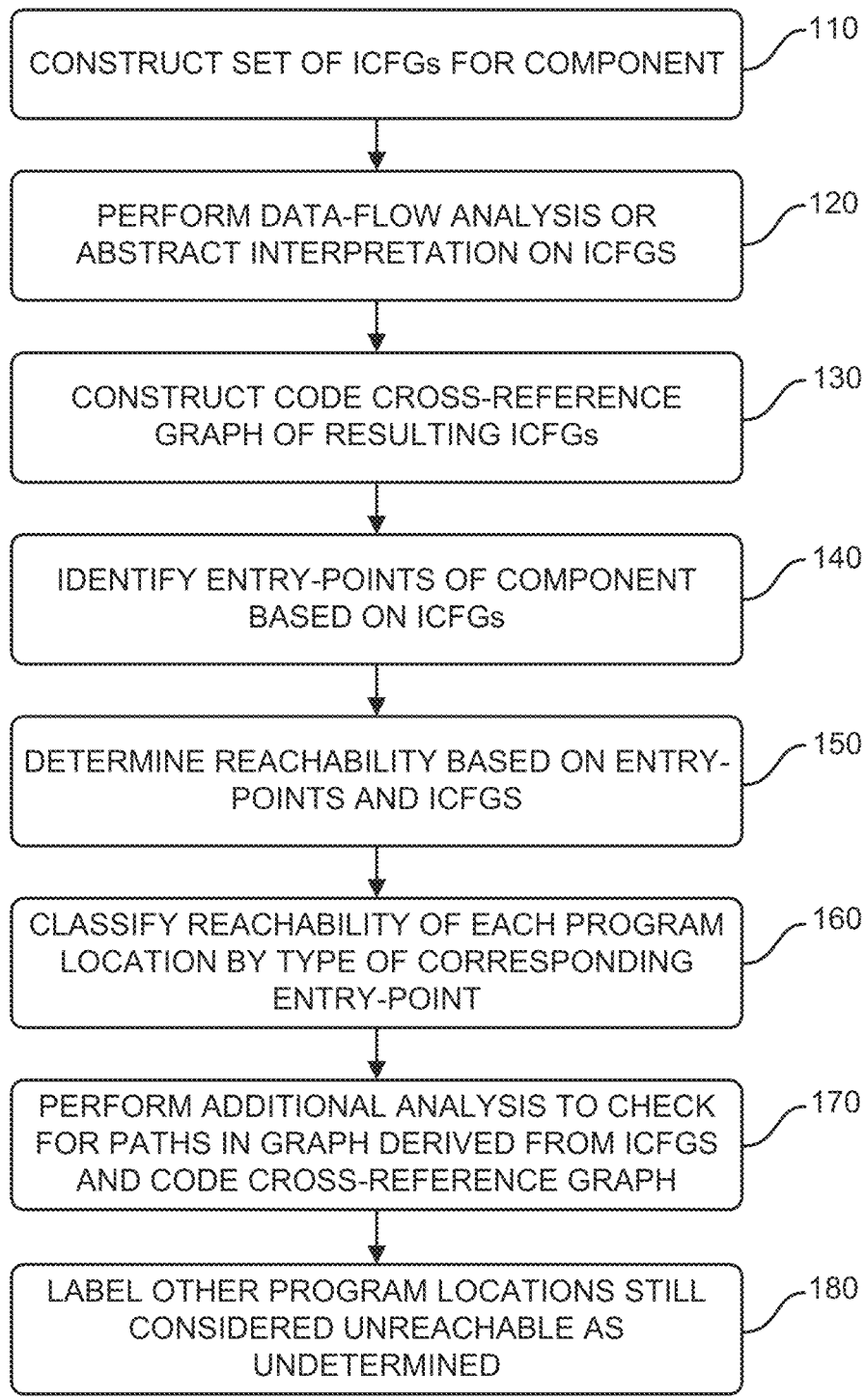
FIG. 1 is a process flow diagram for characterizing code property reachability analysis for binary executables.

In the context of software security, reachability analysis provides a mechanism to assess the ease of exploitability of a particular vulnerability or whether a vulnerability is exploitable at all. While many existing tools and techniques identify potential vulnerabilities in binary programs, not all of those vulnerabilities will be exploitable, and for those that are, the difficulty of exploitability under real-world conditions is hard to estimate without considering the wider context. Reachability in the current context can also be characterized as referring to providing an estimation of the exploitability properties of the binary executable by attempting to quantify or measure the difficulty required to reach a potentially vulnerable code location with respect to the environment the vulnerability containing component exists, the exposed attack surface of the environment, and any counter-measures (mitigations, hardening) in play.

Provided herein is a mechanism to compute reachability for binary executables (sometimes simply referred to as a binary) and two extensions of the technique to compute reachability between multiple executables and reachability within the context of an execution environment. These reachability analyses can be used to determine whether the executables or components therein present any potential vulnerabilities which, in turn, can cause a computing system executing such binary executable to exhibit undesired behavior. The analyses include determining reachability metrics for each of a plurality of program locations. These metrics are used to determine an environment-aware reachability metric reflecting the runtime properties of a computing environment specified by artefacts associated with the software. Data characterizing the determined environment-aware reachability metrics for the components are provided to a consuming application or process. Remediation actions can then be undertaken to address any security vulnerabilities in the software or take other actions before it is deployed or otherwise allowed to execute.

If and how a vulnerable program construct is reachable is generally considered a reasonable proxy for assessing the ease of exploitability of a particular vulnerability or whether the vulnerability is exploitable at all. However, in a static context, computing reachability is neither straightforward, nor a metric where a Boolean outcome is likely to provide assurance of exploitability or non-exploitability. The current subject matter provides a taxonomy for characterizing different kinds of reachability as well as techniques to compute the reachability characteristics of a given (vulnerable) program point with respect to the environment the vulnerability containing software is deployed in.

The analyzed software can be encapsulated in a container which can be characterized as a collection of software components and associated artefacts. Component, in this context, refers to a single piece of software, e.g., an executable, shared library, or firmware blob. Artefact, in this context, refers to any non-software file or blob that exists within a container. In other cases, the analysis commences when receiving a single executable (as opposed to a container of executables).

As noted above, the vulnerability analyses provided herein can be environment specific. Environment refers to a static or dynamic configuration of components and artefacts. An environment determines which components within a container to load, which component is run first, and/or which components run at all. In some cases, an environment and/or container can contain a component loader, that is, a component that can be used to execute other components. The environment can provide a mechanism to configure components such that one or more components within a given environment may interact with each other. The environment can also provide a mechanism for restricting how components interact with each other, with artefacts (e.g., via filesystem permissions), and with the outside world.

Entry points within components can be useful for vulnerability analyses. An entry point can be characterized as a location within a component that execution can start from, e.g., the main function in an executable component, or one of the exported functions within a shared library. An entry point may or may not be advertised to other components or the environment's program loader.

Intra-component reachability. A software component contains one or more functions, and these functions can call each other and the functions of other components, depending on the properties of the environment. A function can be decomposed into so-called basic blocks, which are sequences of one or more machine code instructions that are always terminated by a control-flow altering instruction, e.g., an instruction that causes a branch, call, interrupt, or exception. Each instruction within a basic block can be considered a program point. The reachability of a program point, given the definition of a basic block, is therefore equivalent to the reachability of the basic block containing it.

Control-flow properties. Control transfers between each basic block within a component can be modeled by representing the component as one or more inter-procedural control-flow graphs (ICFGs). The vertices of such graphs are basic blocks and the edges are control-flow operations.

These graphs statically model how control transitions between both functions and basic blocks by different control-flow altering operations. Multiple graphs may be required to represent a single component, for example, where a component contains so-called dead or unreachable code, when it is a library of related functionality, or when it is not possible to completely recover the target of one or more indirect branches or calls.

Data-flow properties. A control-flow graph representation of a component can be used to model the data-flow of such component (i.e., how data moves between different program variables), and the properties of the values held in those variables at different points during execution. Using an abstract interpretation technique such as Value Set Analysis (VSA), or a data-flow technique such as constant propagation, an approximation of the values a given variable can hold at a given point can be computed. With this information, two operations can be performed on the ICFGs. First, the ICFGs can be updated by adding new control-flow edges when it is possible to infer the possible values a variable holds when used as the target of an indirect branch or call instruction. Second, the ICFGs can be updated by removing control-flow edges when it is possible to infer that the value of a variable used to determine if a branch is taken or not may only have a single value.

Code cross-reference properties. The information described above also allows for building a second graph-based model of a component based on the direct and indirect targets of its load operations. Such a graph is referred to herein as a code cross-reference graph. This graph can be overlayed onto the ICFGs of the component to model their potential dependencies.

FIG. 1 is a process flow diagram 100 for computing reachability of one or more program points within a component. Initially, at 110, a set of initial ICFGs can be constructed for a component. Different techniques can be utilized to generate the set of initial ICFGs including, for example, recursive descent disassembly, linear disassembly, or a combination/variation of one or both. Subsequently, at 120, a data-flow analysis or an abstract interpretation (as described above) of the ICFGs is performed to determine potential unreachable or dead-code, and missing edges and/or basic blocks. This analysis results in a number of data-flow graphs (DFGs) representing the relationships between variables and program points within each ICFG. A code cross-reference graph of the resulting ICFGs is then, at 130, constructed. In particular, a graph with vertices representing basic blocks and edges representing load operations referencing program points is constructed. The load operations can also represent transitive relations, for example, if there is a reference from block A to a data structure D and data structure D refers to block B, then an edge from block A to B can be generated.

Next, at 140, entry points of the components are identified based on the ICFGs. This process will vary depending on the platform the component is from and the type of the component. As a first example, a shared library will export a number of functions that can be called by other components—each of these functions will be characterized as a viable entry point. As another example, an executable will export a start or main function such a function can be considered as a viable entry point. A further example, a UEFI driver/module can export functionality via a protocol interface; they may also register functions to be called upon particular events. All functions exported using these mechanisms can be considered as viable entry points. Moreover, for firmware that contain an Interrupt Vector Table (IVT), the defined Interrupt Service Routines (ISRs) can be considered as viable entry points.

Referring back again to FIG. 1, at 150, a check can be performed, based on corresponding set of entry points, ICFGs, and program locations of interest, to determine if there exists a path from any identified entry point to each program point. Such an arrangement can be treated as a general reachability problem. In some cases, a second, heavier (i.e., more computationally expensive) analysis of each path can be performed to provide a reachability proof. This proof can be constructed by symbolically executing the path.

Thereafter, at 160, given the set of reachable program locations, the reachability of each location is classified by the type of entry point(s) used to reach it (further details are provided below). A second analysis can be performed, at 170, for program locations that are not reachable from any identified entry points. This second analysis can check for paths in the graph derived from merging the ICFGs and code cross-reference graph. In addition, at 180, any remaining program locations that are still considered unreachable are labeled to indicate that their reachability is undetermined. The result of the analyses can be provided, at 190, to a consuming application or process to take further actions to characterize or otherwise address vulnerabilities identified in the component.

As referenced above, reachability can be classified or otherwise characterized to reflect a level of risk (i.e., software vulnerability risk, etc.). Different categories can be used such as, but not limited to, direct reachability, exported reachability, referenced reachability, and undetermined reachability. Direct reachability can be used if there exists a path from the original entry point (e.g., main or start function) of the component analyzed to the vulnerable program location. Exported reachability can cover indirect reachability. For example, for shared libraries, exported functions can be considered as viable entry points, and if a finding is reachable from an exported function, then the finding can be reported as "exported" reachability. The exported reachability classification can also be used for identified System Management Interrupt (SMI) handlers, functions in registered protocol interfaces and PEIM-to-PEIM interfaces (PPIs), in UEFI modules/drivers. Referenced reachability can refer to cases in which a vulnerable point is reachable because it is referenced by code that is reachable by direct or exported reachability, but it is not possible to determine the exact reachability statically. Undetermined reachability can cover cases in which it is not possible to determine reachability statically.

In addition to a classification of reachability, "trace evidence" can be computed. Trace evidence can include, for example, one or more paths through the ICFG to show that a given point is reachable, and metrics quantifying the difficulty of reaching a given program point via each of those paths. These metrics can include quantifications of branching/sub-call graph complexity, distance metrics computed on the paths, number of possible paths that allow a given point to be considered reachable.

Extended reachability properties. Given a component does not operate in isolation of its environment, it is desirable to contextualize the reachability characteristics of a given vulnerable location with respect to properties that can be inferred about the environment the component will be executed within. This leads to the notions of inter-component reachability and environment-aware reachability.

Inter-component reachability. Similar to how the control-flow graphs of a single component is constructed, by considering the exported functions of each component, and "external" functions called by each component, an "inter-component call-graph" between components can be generated representing inter-component reachability. The vertices of the graph are components and the edges are exported functions. By checking for the existence of paths within this graph, each of a component's entry points can be associated with a measure of viability to provide a more granular risk measurement. Concretely, F is a viable (exported) entry point if we find a component A that calls the exported function F from component B.

The above inter-component reachability approach can be extended to take into account various platform specifics, for example, Linux-like platforms provide a mechanism to load a shared library at runtime (dlopen) and resolve function symbols (dlsym). In some cases, it is possible to identify such behaviour statically, and the inter-component call-graph can be modified to take this into account.

Environment-aware reachability. Recall that within an execution environment there are both artefacts and software components. While artefacts may be regular files, they may also serve to configure the runtime properties of the environment. For example, in an embedded Linux environment, there may be one or more boot scripts that determine which software components will be loaded and executed during the initialization of the environment. This list of components along with any later stage component-specific configuration files (artefacts), will determine the set of components that can run. While this set may not be completely determined statically, the set of components can be approximated and this information can be used to mark the viability of all components' entry points within the inter-component call-graph, allowing for even finer-grained risk assessment.

Other examples of how environment restrictions can be taken into account when determining component entry point viability can include (i) a docker container's "entry point"—a configuration key associated with a docker container that determines which program or script to execute when the container is launched and/or (ii) a second-stage payload blob and associated program location specified by a bootloader's configuration.

Reachability use-cases. As noted above, reachability is generally considered a reasonable proxy for assessing the ease of exploitability of a particular vulnerability or whether the vulnerability is exploitable at all. When used in this context, reachability can be considered a complementary metric to existing industry standard vulnerability severity and exploitability metrics, such as CVSS, EPSS, SSVC, and so on.

Reachability can be used for a variety of applications. As one example, reachability information can be used for triage prioritization. Triage prioritization can include assigning priority in which a given vulnerability should be assessed. For example, higher risk vulnerabilities would be assessed prior to lower risk vulnerabilities. Reachability can also be used for remediation prioritization which can specify the priority in which a given vulnerability should be patched or fixed. Reachability can also be helpful in assessing risk of third party components in the context of a larger product or code-base (i.e., risk associated with introducing a component with a known vulnerability with a given reachability profile). Further, reachability can be used as a risk reweighting factor. That is, when reachability is computed on an environmental or inter-component level, reachability may be used to re-score the impact or severity of a known vulnerability (i.e., its CVSS score) considered in the context of where the vulnerability exists within a wider product or code-base.

Figure 2:
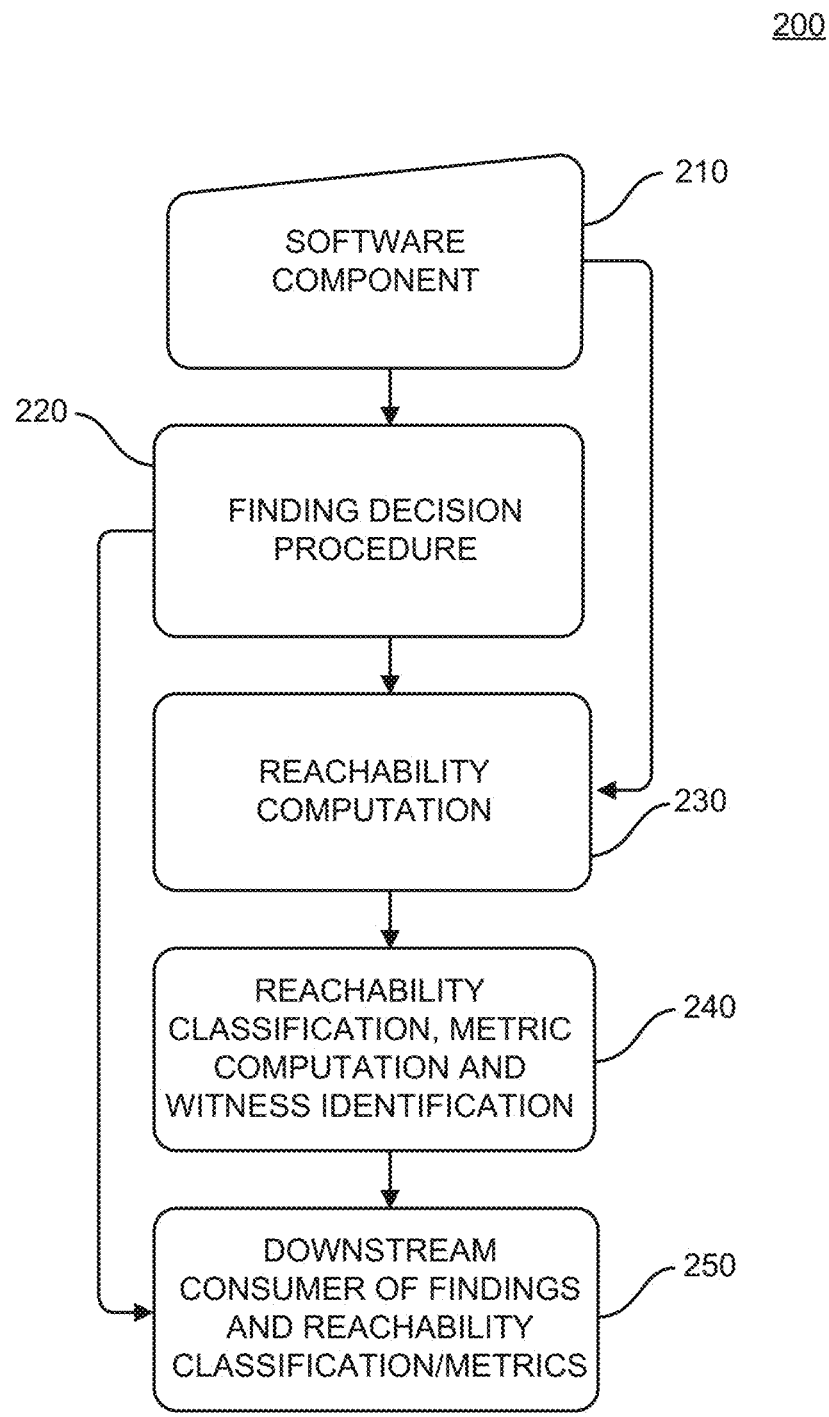
FIG. 2 is a process flow diagram for characterizing end-to-end reachability for binary executables.

FIG. 2 is a process flow diagram 200 for characterizing end-to-end reachability within a software component of a binary executable. Initially, at 210, a software component is accessed so that, at 220, a finding decision procedure can be executed. The finding decision procedure can include analyzing the software component in order to produce a set of program points that satisfy some criteria (i.e., a pre-defined property, etc.). A reachability computation is performed, at 230, using, for example, one of the techniques described herein. The reachability computation generates, at 240, various reachability information including a reachability classification (e.g., direct, exported, referenced, undetermined, etc.), metric computation (i.e., characterization of the difficulty of an attacker providing an input/conditions such that the binary executable will exercise the target vulnerable location with the conditions needed to trigger a crash, etc.), and witness identification. The generated reachability information, at 250, can be sent to a consuming application or process (referred to herein as a downstream consumer). The downstream consumer, in turn, can utilize the generated information for various purposes including, for example, triage prioritization, remediation prioritization, risk assessment of third party components, risk reweighing, and the like.

Figure 3:
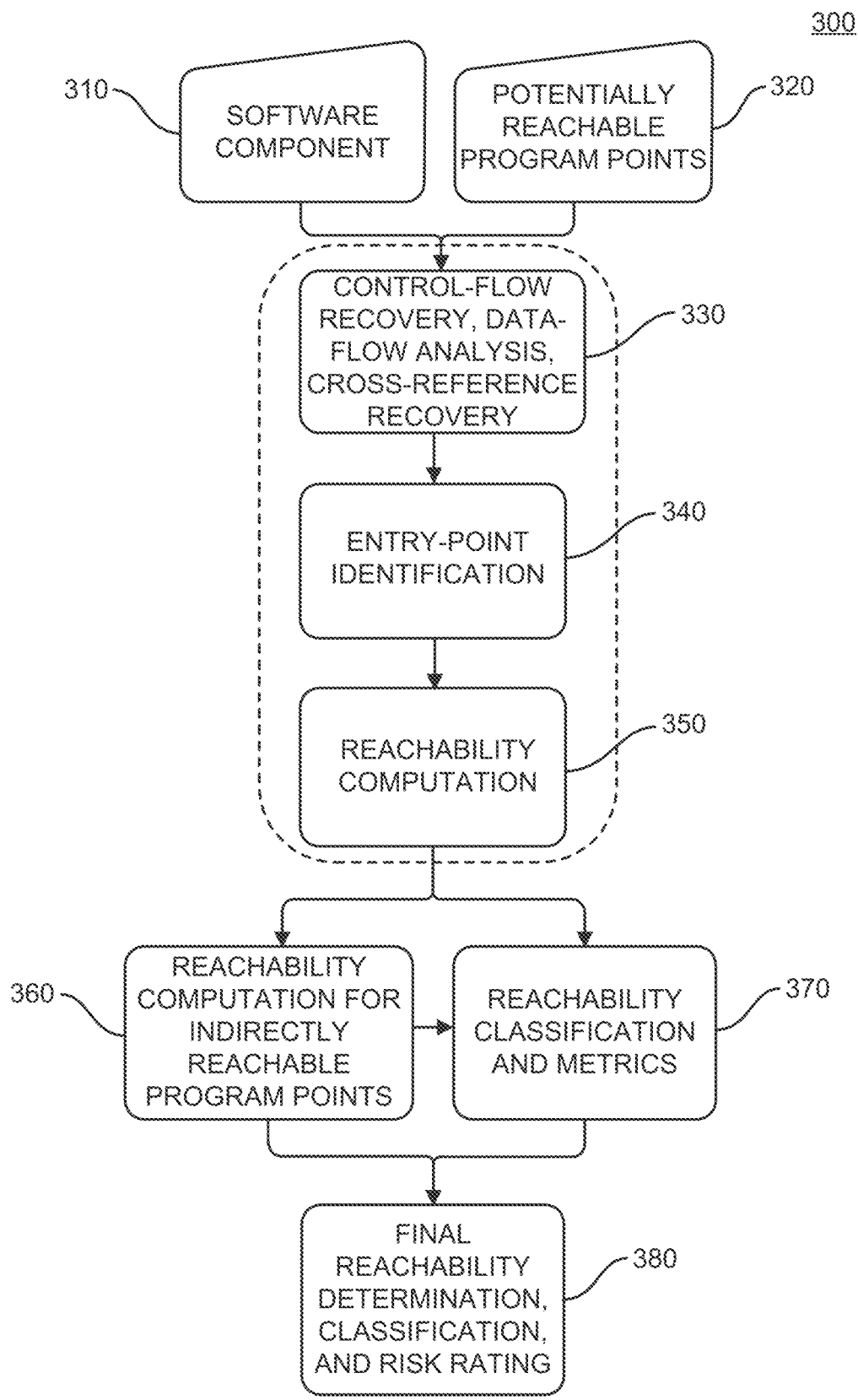
FIG. 3 is a process flow diagram for characterizing intra-component reachability for binary executables.

FIG. 3 is a process flow diagram 300 for characterizing intra-component reachability for binary executables in which a software component 310 is analyzed so that a number of graph representations can be generated which characterize aspects such as reachability. Along with the software component 310, potentially reachable program points 320 are used to generate, at 330, representations of the software component 310 such as a control-flow recovery graph, a data-flow analysis graph, a cross-reference recovery graph. These graphs are used, at 340, to identify entry points to the software component 310. Thereafter, at 350, a reachability computation is conducted. This computation uses the generated representations (330) and the identified entry points (340) along with the potentially reachable program points (320) in order to construct a reachability trace or proof (i.e., a path through the ICFG from an entry to a potentially reachable program point for each potentially reachable program point).

Figure 4:
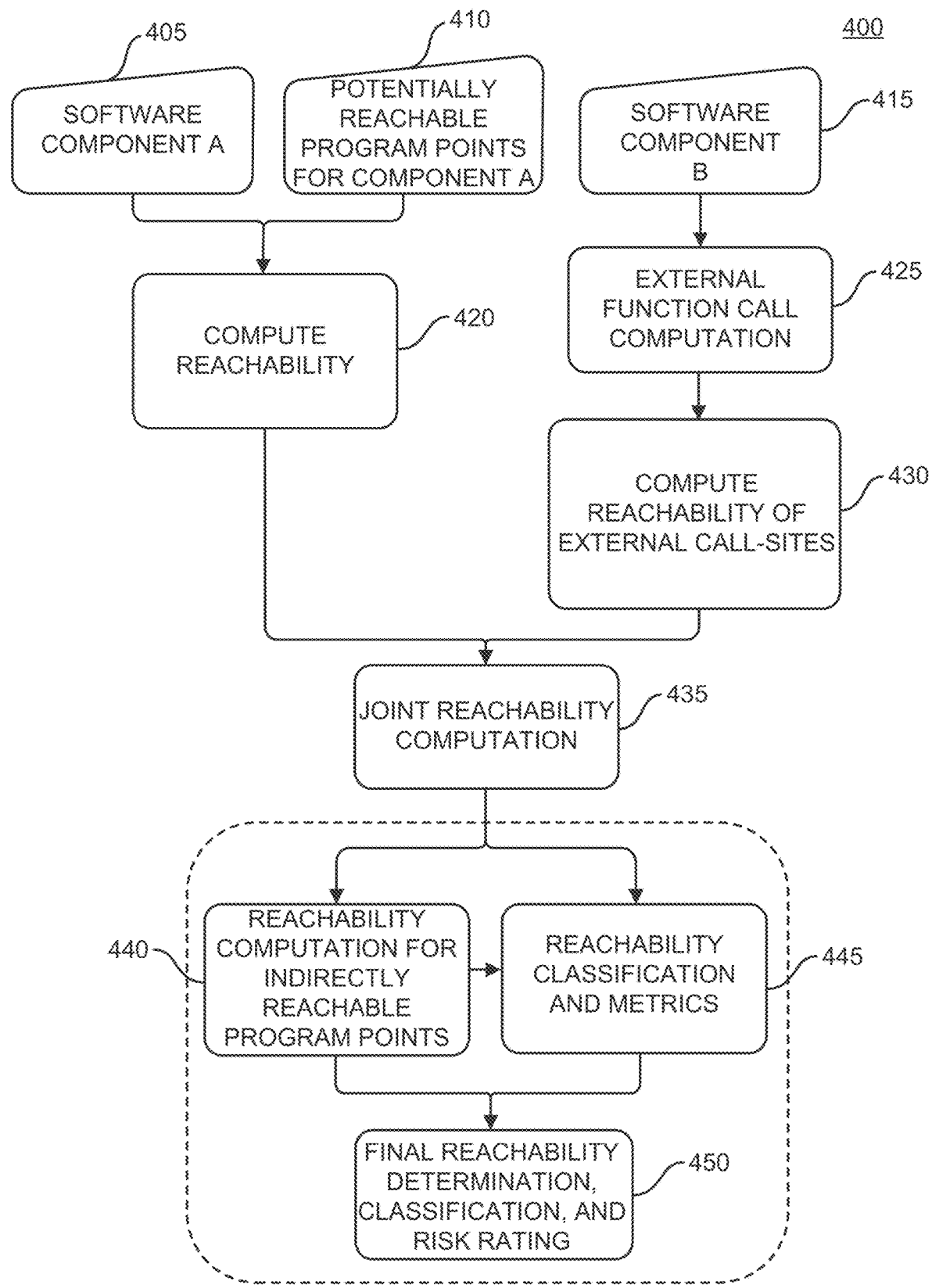
FIG. 4 is a process flow diagram for characterizing inter-component reachability for binary executables.

FIG. 4 is a process flow diagram 400 for characterizing inter-component reachability for binary executables in which software component A 405 along with its associated potentially reachable program points 410 are used, at 420, to compute reachability (using, for example, operations 330-350 of FIG. 3). In addition, a second software component B 415 is analyzed to compute, at 425, external function calls so that, at 430, reachability of the external call's call-sites can be computed (using, for example, operations 330-350 of FIG. 3). Thereafter, at 435, a joint reachability computation for software component A 405 and software component B 415 is computed. As an illustration, software component A 405 can export some pieces of code that are potentially reachable externally (i.e. software component B 415 can call a function in software component A 405 and trigger a vulnerable program point). Therefore, those points in software component A 405 must be found, and then find the points in software component B 415 that can call to software component A 405 (and the properties of those call sites). These points then act as "potentially reachable program points" for operation 430 at which the reachability of those points are computed as if they were vulnerable locations.

After this point, an attempt is made to compute the reachability across the boundaries of each component as if they were actually joined together at each one of these reachable "external" call-sites. Once the joint reachability computation is generated, a reachability computation can be conducted, at 440, for indirectly reachable program points. In addition, the joint reachability computation can be used, at 445, to classify reachability (i.e., specify reachability type, etc.) and/or to generate metrics characterizing reachability. In some variations, the classification and/or metrics can be informed by the output of the reachability computation for indirectly reachable program points. Operations 440, 445 can be used to generate, at 450, a final reachability determination, and risk rating. With reference to FIG. 4, operations 440-450 are used to propagate findings reachable from software component A 405 by way of software component B 415. Reachability from software component B 415 to software component A 405 can be established by way of an external call site (i.e., exported reachability from software component A 405 via an external call from software component B 410).

Figure 5:
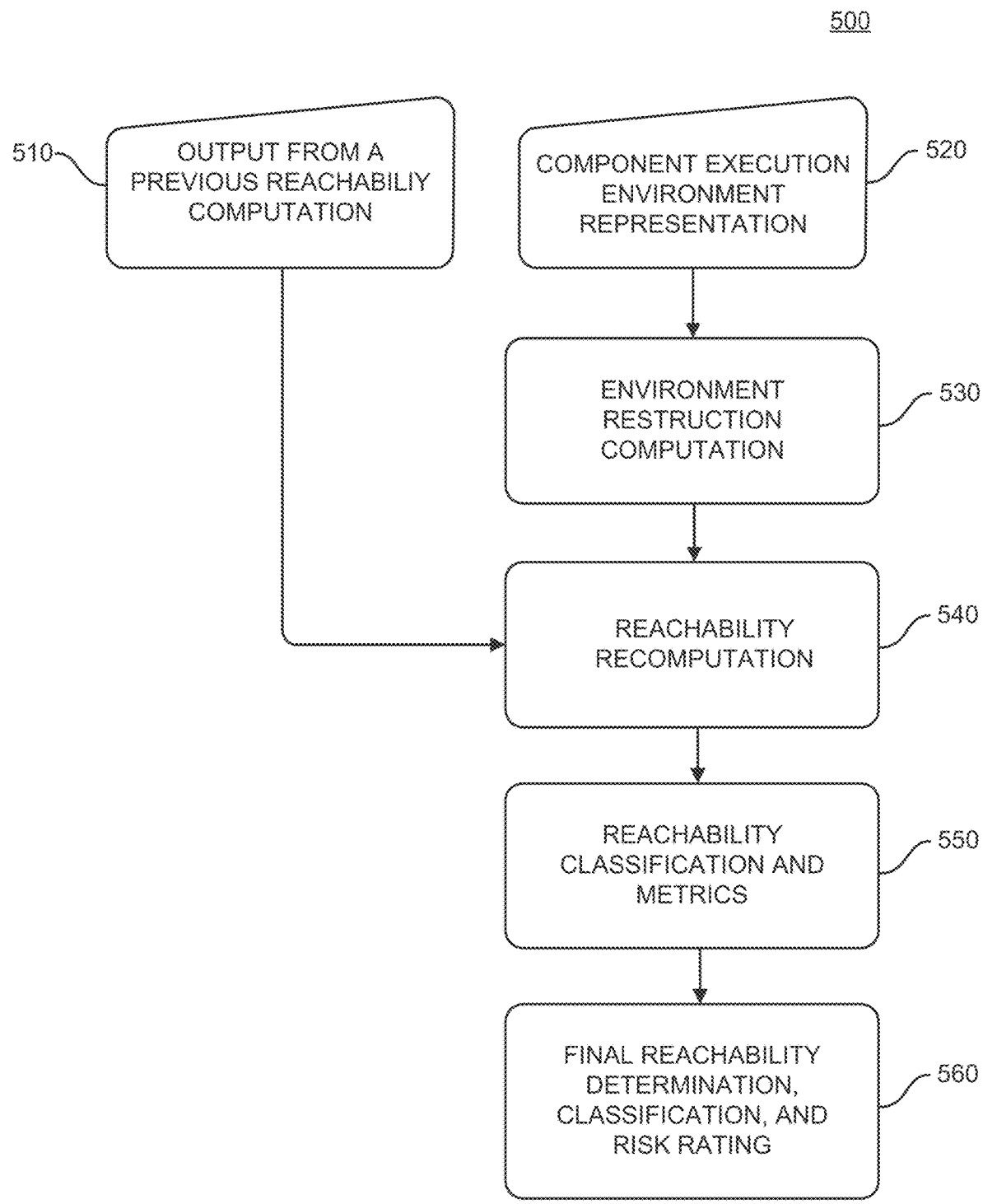
FIG. 5 is a process flow diagram for characterizing environment-aware reachability for binary executables.

FIG. 5 is a process flow diagram 500 for characterizing environment-aware reachability for binary executables. Initially, at 520, a representation of a software component execution environment is received. This representation is used, at 530, to reconstruct the execution environment. The execution environment is of particular interest as it can affect the reachability properties because it determines how and what code within it executes, what privileges are required to exercise certain program paths. For example, given the properties of its execution environment, a software component that is vulnerable may never be executed, and hence a previously reachable vulnerability can be downgraded to "not reachable" at this point. There can also be cases in which a given point is only reachable by an "authenticated" user, which would limit the reachability. Once the execution environment has been characterized, then an output from a previous reachability computation 510 can be used to recompute reachability (using for example, operations 330-350 of FIG. 3. The recomputed reachability is used, at 550, to classify reachability of various program points and generate associated metrics. Thereafter, at 560, a final reachability determination can be calculated, along with associated program point reachability classifications and associated metrics.

With the current subject matter, a reachability analysis for software includes receiving an executable or a container comprising a plurality of software components and artefacts. At least a portion of the artefacts configure runtime properties of a computing environment executing the software components. Thereafter, the container is decomposed into the plurality of software components and the artefacts. A reachability metric is determined for each component for each of a plurality of program locations. It is then determined, for each component based on its reachability metrics, an environment-aware reachability metric reflecting the runtime properties of the computing environment specified by the artefacts. Data characterizing the determined environment-aware reachability metrics for the components can be provided to a consuming application or process.

The consuming application or process can identify security vulnerabilities or other issues in the software package which require remediation or other action. Responsive action such as initiating at least one remediation action can be initiated to address the identified security vulnerabilities. The remediation actions can take varying forms including patching or fixing the identified security vulnerabilities, preventing at least a portion of the software components from being executed, quarantining the container, and the like.

The determination of the reachability metrics can include constructing a set of inter-procedural control-flow graphs (ICFGs) for each component. In some variations, the determination of the reachability metrics includes analyzing the ICFGs to identify structural properties indicative of reachability. The structural properties can include unreachable code, dead code, missing edges, and/or missing blocks. The determination of the reachability metrics can include constructing, for each component, a code cross-reference graph based on the ICFGs, the code cross-reference graph having vertices representing basic blocks and edges representing load operations reference program points. The determination of the reachability metrics can include identifying, based on the ICFGs, entry points for each component. The determination of the reachability metrics can include determining, for each component based on the corresponding entry points, the ICFG, and program locations, a set of reachable program locations. The determination of the reachability metrics further can include classifying each reachable program location by a type of entry point used to reach such reachable program location. The determination of the reachability metrics can include merging, for components having program locations that are deemed to be unreachable, the code cross-reference graph and the ICFGs to result in a merged graph, and checking paths in the merged graph to determine whether the program locations that were deemed to be unreachable are reachable. The determination of the reachability metrics can include labeling, based on the checking of paths in the merged graph, any program locations determined to be unreachable.

The reachability metric can characterize one or more of direct reachability, exported reachability, referenced reachability, or undetermined reachability.

In addition, data characterizing a software component and potentially reachable program points within the software component is received. The received data is used to perform each of a control-flow recovery, a data-flow analysis, and a cross-reference recovery so that entry points can be identified. Reachability is computed for the identified entry points. Data characterizing the computed reachability is provided to a consuming application or process.

Reachability can also be computed for indirectly reachable program points

Reachability for the entry points can be classified. Metrics characterized reachability can also be generated. The provided data characterizing computed reachability includes the reachability classifications and the generated metrics.

Further, software is analyzed by receiving data characterizing each of a first software component and a second software component. Reachability is computed in the first software component. In addition, external functional calls are computed in the second software component. A joint reachability computation is computed for the first and software component and the second software component based on the computed reachability and the computed external function calls. Data characterizing the computed joint reachability computation is provided to a consuming application or process.

Classifications can be generated which characterize reachability for entry points in each of the first software component and the second software component. In addition, metrics characterizing reachability can be generated for each of the first software component and the second software component. The provided data characterizing the computed joint reachability can include the reachability classifications and the generated metrics.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for analyzing reachability in binary executables comprising:
   receiving an executable or container comprising a plurality of software components and artefacts, at least a portion of the artefacts configuring runtime properties of a computing environment executing the software components;
   decomposing the executable or container into the plurality of software components and the artefacts;
   determining, for each component, a reachability metric for each of a plurality of program locations by:
   constructing a set of inter-procedural control-flow graphs (ICFGs) for each component;
   analyzing the ICFGs to identify structural properties indicative of reachability;
   constructing, for each component, a code cross-reference graph based on the ICFGs;
   identifying, based on the ICFGs, entry points for each component;
   determining, for each component based on the corresponding entry points, the ICFG, and program locations, a set of reachable program locations;
   classifying each reachable program location by a type of entry point used to reach such reachable program location;
   merging, for components having program locations that are deemed to be unreachable, the code cross-reference graph and the ICFGs to result in a merged graph; and checking paths in the merged graph to determine whether the program locations that were deemed to be unreachable are reachable;

determining, for each component based on the reachability metrics, an environment-aware reachability metric reflecting the runtime properties of the computing environment specified by the artefacts; and providing data characterizing the determined environment-aware reachability metrics for the software components to a consuming application or process.

2. The method of claim 1, wherein the consuming application or process identifies security vulnerabilities in the software package.

3. The method of claim 2 further comprising:
initiating at least one remediation action to address the identified security vulnerabilities.

4. The method of claim 3, wherein the at least one remediation action comprises:
patching or fixing the identified security vulnerabilities.

5. The method of claim 3, wherein the at least one remediation action comprises:
preventing at least a portion of the software components from being executed.

6. The method of claim 3, wherein the at least one remediation action comprises:
quarantining the executable or container.

7. The method of claim 1, wherein the structural properties comprises: unreachable code, dead code, missing edges, and/or missing blocks.

8. The method of claim 1, wherein
the code cross-reference graph has vertices representing basic blocks and edges representing load operations reference program points.

9. The method of claim 1, wherein the determination of the reachability metrics further comprises:
labeling, based on the checking of paths in the merged graph, any program locations determined to be unreachable.

10. The method of claim 1, wherein the reachability metric characterizes one or more of component direct reachability, exported reachability, referenced reachability, or undetermined reachability.

11. A method for analyzing software comprising:
receiving first data comprising software to be analyzed and associated artefacts;
determining a reachability metric for each of a plurality of program locations in the software by:
constructing a set of inter-procedural control-flow graphs (ICFGs) for each component;
analyzing the ICFGs to identify structural properties indicative of reachability;
constructing, for each component, a code cross-reference graph based on the ICFGs;
identifying, based on the ICFGs, entry points for each component;
determining, for each component based on the corresponding entry points, the ICFG, and program locations, a set of reachable program locations;
classifying each reachable program location by a type of entry point used to reach such reachable program location;
merging, for components having program locations that are deemed to be unreachable, the code cross-reference graph and the ICFGs to result in a merged graph; and checking paths in the merged graph to determine whether the program locations that were deemed to be unreachable are reachable;

determining, based on the determined reachability metrics, an environment-aware reachability metric reflecting runtime properties of a computing environment as specified by the artefacts; and providing second data characterizing the determined environment-aware reachability metrics to a consuming application or process.

12. The method of claim 11, wherein the consuming application or process identifies security vulnerabilities in the software package, and the method further comprises:
initiating at least one remediation action to address the identified security vulnerabilities.

13. The method of claim 12, wherein the at least one remediation action comprises one or more of:
patching or fixing the identified security vulnerabilities;
preventing at least a portion of the software components from being executed; or
quarantining the software.

14. The method of claim 11, wherein the determination of the reachability metrics further comprises:
labeling, based on the checking of paths in the merged graph, any program locations determined to be unreachable.

15. The method of claim 11, wherein the reachability metric characterizes one or more of component direct reachability, exported reachability, referenced reachability, or undetermined reachability.

16. A method for analyzing software comprising:
receiving first data characterizing a software component and potentially reachable program points within the software component;
performing, based on the received data, each of a control-flow recovery, a data-flow analysis, and a cross-reference recovery;
identifying entry points based on the performed control-flow recovery, data-flow recovery and cross-reference recovery;
classifying reachability for the entry points;
generating metrics characterizing reachability;
computing reachability for the identified entry points; and
providing second data characterizing the computed reachability including the reachability classifications and generated metrics to a consuming application or process.

17. The method of claim 16 further comprising:
computing reachability for indirectly reachable program points.

18. The method of claim 16, wherein the consuming application or process identifies security vulnerabilities in the software package, and the method further comprises:
initiating at least one remediation action to address the identified security vulnerabilities.

19. The method of claim 18, wherein the at least one remediation action comprises one or more of:
patching or fixing the identified security vulnerabilities;
preventing at least a portion of the software components from being executed; or
quarantining the software.

20. A method for analyzing software comprising:
receiving first data characterizing each of a first software component and a second software component;
computing reachability in the first software component;
computing external function calls in the second software component;

classifying reachability for entry points in each of the first software component and the second software component;

generating metrics characterizing reachability for each of the first software component and the second software component;

computing a joint reachability computation for the first software component and the second software component based on the computed reachability and the computed external function calls; and providing second data characterizing the computed joint reachability computation including the reachability classifications and the generated metrics to a consuming application or process.

21. The method of claim 20, wherein the consuming application or process identifies security vulnerabilities in the software package, and the method further comprises:

initiating at least one remediation action to address the identified security vulnerabilities.

22. The method of claim 21, wherein the at least one remediation action comprises one or more of:

patching or fixing the identified security vulnerabilities;

preventing at least a portion of the software components from being executed; or quarantining the software.

\* \* \* \* \*